Nov. 25, 1941.　　　R. V. GRAYSON　　　2,263,695
APPARATUS FOR DEVEINING SHRIMP
Filed Dec. 16, 1939　　2 Sheets—Sheet 2
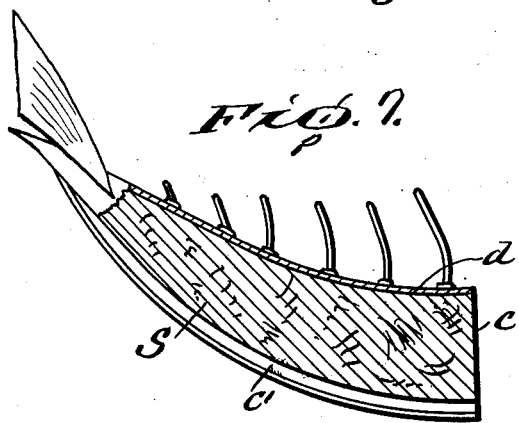
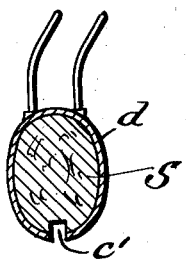
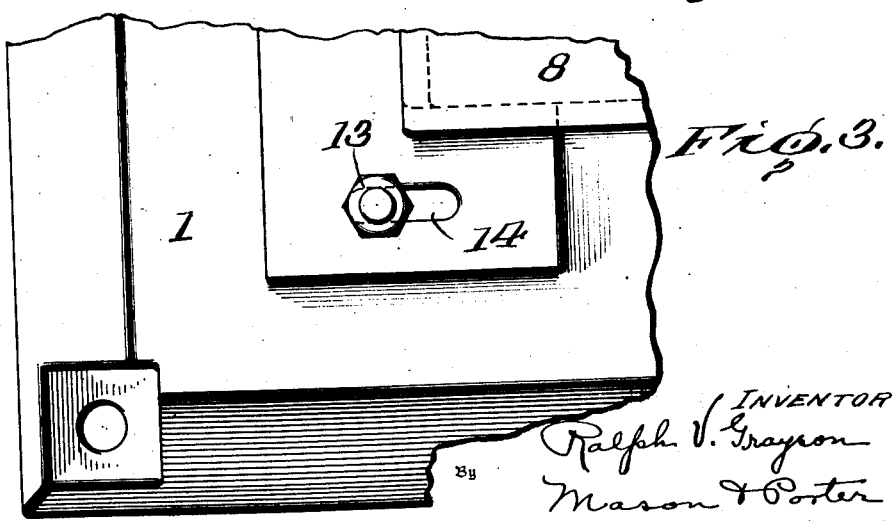
INVENTOR
Ralph V. Grayson
By Mason & Porter
ATTORNEYS Patented Nov. 25, 1941

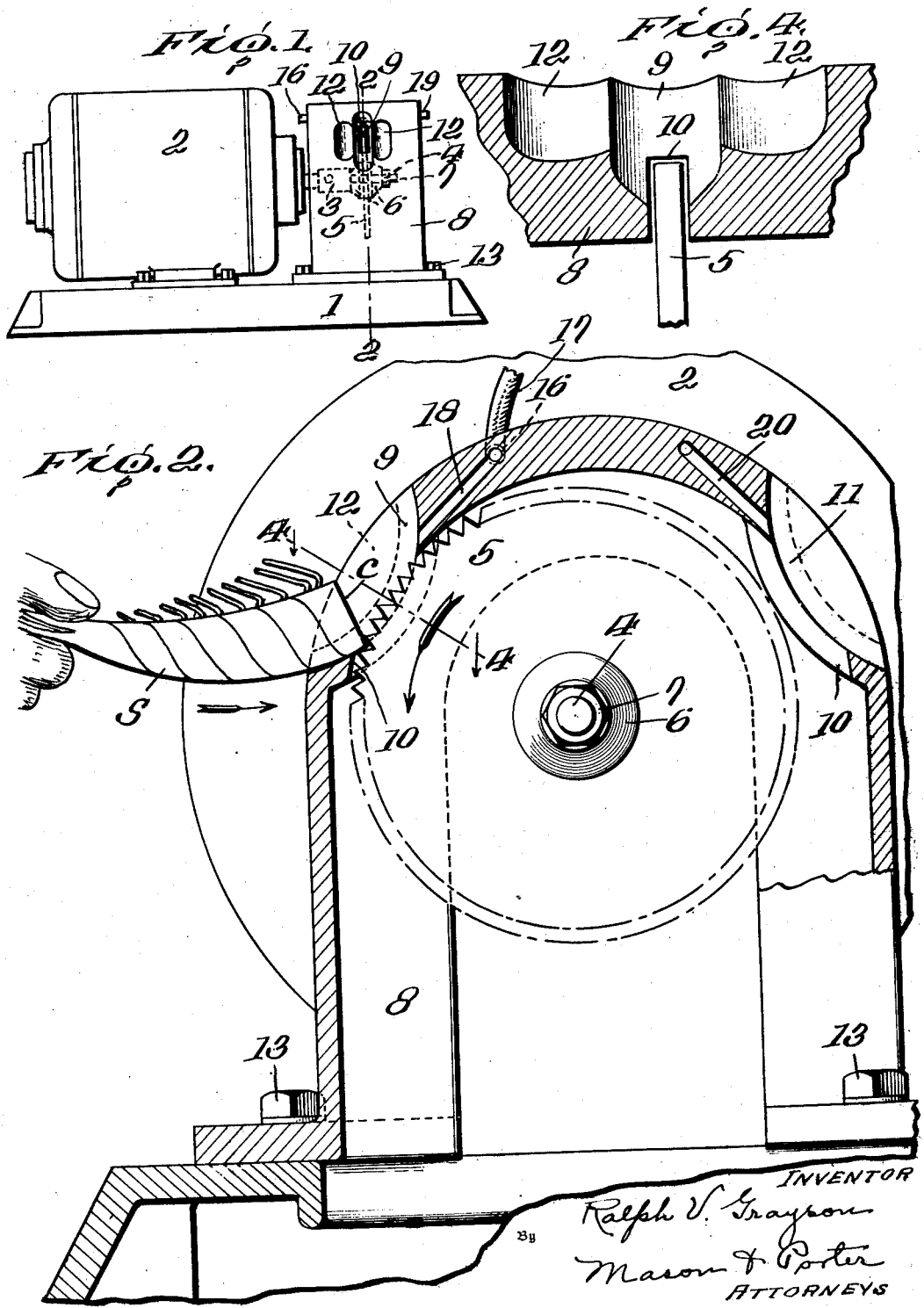

2,263,695

UNITED STATES PATENT OFFICE 2,263,695

APPARATUS FOR DEVEINING SHRIMP

Ralph V. Grayson, Houston, Tex., assignor to Kroger Grocery & Baking Company, Cincinnati, Ohio, a corporation of Ohio Application December 16, 1939, Serial No. 309,662

12 Claims. (Cl. 17—2)

In my co-pending application Serial No. 309,097, filed December 13, 1939, I have described a method of preparing shrimp for the market, which method includes cutting away the shell of the shrimp in a narrow region covering the vein and the removing of the vein through the narrow cut-away portion. The present application has to do with an apparatus for carrying out the method.

An object of the invention is to provide an apparatus which will cut a narrow channel extending from the head end to the tail and along the crest or back portion of the shrimp, which channel is of sufficient depth to completely remove the sand vein and the waste matter contained therein.

A further object of the invention is to provide an apparatus of the above type which includes a supporting means along which the shrimp is moved during the cutting operation, which supporting means is adjustable relative to the cutter so as to regulate the depth of the channel which is formed.

A still further object of the invention is to provide an apparatus of the above type which is provided with means for forcibly projecting a stream of water into the channel as it is being formed for the purpose of washing out the ruptured parts.

A still further object of the invention is to provide an apparatus of the above type wherein the cutting device is provided with teeth so disposed relative to the guiding means for the shrimp that the teeth strike the shell of the shrimp so that the cutting force is in an outward direction relative to the shell.

These and other objects will in part be obvious and will in part be hereinafter more fully disclosed.

In the drawings which show by way of illustration one embodiment of the invention—

Figure 1 is a front view of an apparatus embodying the improvements;

Fig. 2 is an enlarged sectional view on the line 2—2 of Figure 1;

Fig. 3 is an enlarged plan view of the portion of the apparatus showing the means whereby the housing carrying the support for the shrimp can be shifted relative to the cutter;

Fig. 4 is a sectional view on the line 4—4 of Figure 2;

Fig. 5 is a side view on an enlarged scale of a portion of the cutting disk;

Fig. 6 is an enlarged edge view of a portion of the cutting disk;

Fig. 7 is a diagrammatic longitudinal sectional view through a shrimp which has been de-veined by my improved apparatus, and Fig. 8 is a transverse sectional view near the head end of the shrimp after it has been de-veined.

In the carrying out of the invention, a cutter is used which is preferably provided with teeth which are shaped generally like the teeth of a saw with the cutting points of alternate teeth lying substantially in the plane of the side faces of the cutter. This cutter is rotated at a relatively high speed. Associated with the cutter is a supporting means for the shrimp which is preferably concave both in a longitudinal and in a transverse direction so as to provide a guiding means which is shaped so as to conform generally to the crest or back portion of the shrimp. The cutter extends through a slot extending longitudinally through the guiding means centrally thereof. Means is provided for adjusting the cutter relative to the guiding means so as to regulate the depth of the channel which is cut in the shrimp. There is also means provided for directing a jet of water into and along the guiding means and into the channel and through the shell and into the shrimp for forcibly removing the ruptured parts.

Referring more in detail to the illustrated embodiment of the invention, the de-veining apparatus includes a supporting base 1 on which is mounted a motor 2. Secured on the end of the shaft of the motor is a sleeve 3 carrying a shaft 4 on which the cutter disk 5 is rigidly mounted. The cutter disk may be secured in any suitable way to the shaft. As shown, it is conveniently clamped between the collars 6, 6 of the arbor which is attached to the motor shaft by means of a telescoping sleeve secured by nut 7.

Also mounted on the base 1 is a cutter housing 8. The cutter housing is provided with a recess which forms a guiding channel 9 for presenting the shrimp to the cutting disk. This guiding channel is concave in a longitudinal direction and also concave in a transverse direction. The channel forms a guiding means for directing the shrimp to the cutting disk, and is, therefore, shaped both longitudinally and transversely to conform in a general way to the shape of a shrimp. The shrimp after it has been washed is immersed in cold water, which gives more or less rigidity to the shrimp and greatly facilitates the de-veining of the same. The shimp is graded according to size, and this guiding and supporting channel 9 for directing the shrimp to the cutting disk conforms more nearly to a shrimp of average size of the larger grades. There is a similar grading channel 11 on the other side of the housing 8 which is curved longitudinally and transversely to conform to the average size of the smaller grades of shrimp. These guiding channels may be used interchangeably in connection with the cutting disk, as will be more fully described hereinafter.

Alongside of the guiding channel 9 are channels 12, 12 which are likewise concave, and these channels afford a space for the fingers in the initial placing of the shrimp for the de-veining of the same.

There is a slot 10 disposed longitudinally and centrally of the guiding channel 9 and the housing is so disposed relative to the cutting disk that said cutting disk projects through this slot so as to cut not only a channel in the shell along the crest or back portion thereof, but also to cut away the flesh directly beneath the shell containing the sand vein, and thus it is that the sand vein is ruptured and completely removed from the shrimp. The cutting disk 5 is provided with teeth which are of the nature of the teeth of a saw. The alternate teeth 5a, 5a have their cutting points lying in a plane of one face of the cutting disk, while the points 5b, 5b disposed therebetween lie in a plane containing the other face of the cutting disk. The angle on the approach side of each of the cutting teeth may vary from 160° to 200°, to the radius of the disk at the base of the tooth. It should be, however, of such angle that, when the shrimp is guided along the supporting channel, the face of the tooth will contact with the shell so as to apply a cutting force in an outward direction. The path of movement of the teeth is so adjusted relative to the guiding means for the shrimp that a channel is cut in the fleshy portion of the shrimp of sufficient depth only to completely remove the sand vein. When the saw teeth contact with the shrimp while moving in a general outward direction relative to the shell, then the shrimp is more easily cut, and this can be accomplished by cutting teeth the edges of which are relatively dull, so that there is no danger of the operator injuring the hand in the presenting of the shrimp to the cutting disk. The cutting disk is of such a thickness that the cutting points of the teeth will be spaced so as to cut a very narrow channel through the shell and only of sufficient width to permit the complete removal of the sand vein.

The housing is secured to the base by clamping bolts 13. There is a clamping bolt adjacent each corner of the housing, and these clamping bolts pass through slots 14, which slots lie in planes at right angles to the operating shaft and cutting disk. There is a port extending transversely of the housing having an extension 16 to which a hose 17 may be connected. This port leads to a nozzle port 18 which is so disposed relative to the concave guiding channel for the shrimp that a jet of water may be forcibly directed into the channel and on to the teeth of the cutting disk and into the channel cut in the shrimp for washing away the ruptured parts of the flesh, the sand vein and the shell as they are formed by the cutting teeth. There is a similar extension 19 at the other side of the housing for connection to the hose 17, and this extension is connected with a nozzle port 20 for directing a stream of water along the concave guiding channel 11 when it is positioned for operation in connection with the cutting disk. Assuming that the guiding channel 9 is shaped to conform to the average shrimp of the larger grade, then, when it is desired to adapt the apparatus for operation on shrimp of a smaller grade, the bolts 13 are removed and the housing lifted and turned so as to bring the guiding channel 11 into position for cooperation with the cutting disk. When the housing is shifted, then the hose for supplying the water jet is disconnected from the extension 16 and joined to the extension 19.

The shrimp as soon as they are brought to the dock by the fisherman is promptly weighed and the heads removed. They are then inspected, the culls rejected and the retained shrimp graded. The shrimp are then washed and placed in water sufficiently cold to render them substantially rigid to facilitate the handling of the shrimp and the presenting of the same to the de-veining apparatus. The shrimp indicated at S is grasped by the tail and the cut head end c is laid in a concave channel so that the teeth of the cutting disk will enter the cut end while moving in a direction so that a cutting force is applied in an outward direction relative to the shell and body portion of the shrimp. The housing is so adjusted relative to the cutting disk that the teeth will cut a channel c' sufficiently deep to completely remove the sand vein. The teeth contact with the shell, the fleshy portion of the shrimp and the sand vein, so as to rupture the same progressively as the shrimp is moved along the supporting channel. When the teeth of the cutting disk approach the shell from the inside thereof, not only is the cutting operation made more easy, but the shrimp will be held close in contact with the bottom of the guiding channel and a channel cut along the crest or back portion of the shrimp of substantially uniform depth. The channel c' is cut all the way from the head portion to a point adjacent the tail so that the sand vein is completely removed, and when this channeling operation is completed, then the shrimp is removed from the de-veining apparatus.

This cutting of the channel through the shell along the crest or back portion of the shrimp not only removes the sand vein with the least possible removal of the fleshy portion of the shrimp, but it also releases the shell d so that it can be easily removed from the shrimp.

While I have shown the housing as adjustable relative to the cutting disk, it will be obvious that the motor which supports the cutting disk may be adjusted relative to the housing for positioning the cutting disk relative to the supporting and guiding channel in the housing.

It is also obvious that many changes may be made in the details of construction without departing from the spirit of the invention as set forth in the appended claims.

Having thus described the invention, what I claim as new and desire to secure by Letters Patent, is:

1. A machine for de-veining shrimp comprising a motor, a shaft carried thereby, a cutting disk supported on said shaft, a housing in which said disk is located, said housing having a slot through which said disk projects, a guiding means associated with said slot for directing a shrimp over said cutting disk whereby the shell is cut along the crest in a narrow region and the said vein therebeneath ruptured and removed, and means whereby said housing may be shifted in a direction transversely of the axis of the shaft for regulating the depth to which said disk cuts into the flesh of the shrimp.

2. A machine for de-veining shrimp comprising a motor, a shaft carried thereby, a cutting disk supported on said shaft, and a housing in which said disk is located, said housing having a slot through which said disk projects, said housing being cut away in the region of said slot to form a concave channel extending lengthwise of the slot along which the shrimp may be directed for cutting the shell in a narrow region along the crest and for rupturing the sand vein herebeneath so that it may be removed through the cut-away portion in the shell.

3. A machine for de-veining shrimp comprising a motor, a shaft carried thereby, a cutting disk supported on said shaft, a housing in which said disk is located, said housing having a slot through which said disk projects, said housing being cut away in the region of said slot to form a concave channel extending lengthwise of the slot along which the shrimp may be directed for cutting the shell in a narrow region along the crest and for rupturing the sand vein therebeneath so that it may be removed through the cut-away portion in the shell, and means for directing a jet of water on to the cutting disk for assisting in removing the ruptured parts as they are formed by the cutting disk.

4. A machine for de-veining shrimp comprising a rotary disk having saw teeth shaped so as to provide cutting points disposed alternately at the opposite sides of the disk, and a guiding means for directing a shrimp to the cutting disk whereby the shell of the shrimp in a narrow region extending along the crest is cut away and the sand vein therebeneath ruptured and removed through said cut-away portion.

5. A machine for de-veining shrimp comprising a rotary disk having saw teeth shaped so as to provide cutting points disposed alternately at the opposite sides of the disk, and a guiding means for directing a shrimp to the cutting disk whereby the shell of the shrimp in a narrow region extending along the crest is cut away and the sand vein therebeneath ruptured and removed through said cut-away portion, the advance faces of the saw teeth being disposed so that a cutting force is applied against the shell in an outward direction relative to the body of the shrimp.

6. A machine for de-veining shrimp comprising a rotary disk having saw teeth shaped so as to provide cutting points disposed alternately at the opposite sides of the disk, a guiding means for directing a shrimp to the cutting disk whereby the shell of the shrimp in a narrow region extending along the crest is cut away and the sand vein therebeneath ruptured and removed through said cut-away portion, and means for adjusting the relative position of the guiding means and the cutting disk whereby the depth to which said disk cuts into the flesh of the shrimp may be regulated.

7. A machine for de-veining shrimp comprising a rotary disk having saw teeth shaped so as to provide cutting points disposed alternately at the opposite sides of the disk, a guiding means for directing a shrimp to the cutting disk whereby the shell of the shrimp in a narrow region extending along the crest is cut away and the sand vein therebeneath ruptured and removed through said cut-away portion, and means for directing a jet of water into the cut-away portion for assisting in removing the ruptured parts as they are formed.

8. A machine for de-veining shrimp comprising a rotary disk having saw teeth shaped so as to provide cutting points disposed alternately at the opposite sides of the disk, a guiding means for directing a shrimp to the cutting disk whereby the shell of the shrimp in a narrow region extending along the crest is cut away and the sand vein therebeneath ruptured and removed through said cut-away portion, the advance faces of the saw teeth being disposed so that a cutting force is applied against the shell in an outward direction relative to the body of the shrimp, and means for directing a jet of water against the cut-away portion for assisting in removing the ruptured parts as they are formed.

9. A machine for de-veining shrimp comprising a rotary cutting disk having saw teeth shaped so as to provide cutting points disposed alternately at opposite sides of the disk, and a housing having a slot therethrough in which said cutting disk is located with the disk projecting through said slot, said housing being shaped so as to provide a concave guiding means conforming to the shape of the shrimp and along which the shrimp may be directed with the head end foremost for cutting a channel in the shell along the crest from said head end to the tail, the advance faces of said teeth being disposed so as to apply a cutting force in an outward direction against the shell whereby the sand vein beneath the crest of the shell is ruptured and removed through the cut-away portion of the shell.

10. A machine for de-veining shrimp comprising a rotary cutting disk having saw teeth shaped so as to provide cutting points disposed alternately at opposite sides of the disk, a housing having a slot therethrough in which said cutting disk is located with the disk projecting through said slot, said housing being shaped so as to provide a concave guiding means conforming to the shape of the shrimp and along which the shrimp may be directed with the head end foremost for cutting a channel in the shell along the crest from said head end to the tail, the advance faces of said teeth being disposed so as to apply a cutting force in an outward direction against the shell whereby the sand vein beneath the crest of the shell is ruptured and removed through the cut-away portion, and means for varying the relative position of the housing and the cutting disk for regulating the depth of cut of the disk into the flesh of the shrimp.

11. A machine for de-veining shrimp comprising a rotary cutting disk having saw teeth shaped so as to provide cutting points disposed alternately at opposite sides of the disk, a housing having a slot therethrough in which said cutting disk is located with the disk projecting through said slot, said housing being shaped so as to provide a concave guiding means conforming to the shape of the shrimp and along which the shrimp may be directed with the head end foremost for cutting a channel in the shell along the crest from said head end to the tail, the advance faces of said teeth being disposed so as to apply a cutting force in an outward direction against the shell whereby the sand vein beneath the crest of the shell is ruptured and removed through the cut-away portion of the shell, and means for directing a jet of water into the cut-away portion of the shrimp for removing the ruptured parts as they are formed.

12. A machine for de-veining shrimp comprising a rotary cutting disk, means for supporting and directing the shrimp to the cutting disk whereby the shell of the shrimp in a narrow region extending along the crest is cut away and the sand vein ruptured and removed through said cut-away portion of the shell, and means for directing a jet of water on to the cutting disk in a direction to assist in removing the ruptured parts through the cut-away portion of the shell.

RALPH V. GRAYSON.